July 14, 1970

W. L. SALYER ET AL 3,520,588

AUTOSTEREO PICTURE

Filed May 26, 1967

Walter L. Salyer
James E. Huffaker
INVENTORS

BY William J. French
Leigh B. Taylor
ATTORNEY & AGENT

Walter L. Salyer
James E. Huffaker
INVENTORS

BY William J. French
Leigh B. Taylor
ATTORNEY & AGENT

July 14, 1970 W. L. SALYER ET AL 3,520,588
AUTOSTEREO PICTURE

Filed May 26, 1967 6 Sheets-Sheet 5

Walter L. Salyer
James E. Huffaker
INVENTORS

BY *William J. French*
*Leigh B. Taylor*
ATTORNEY & AGENT

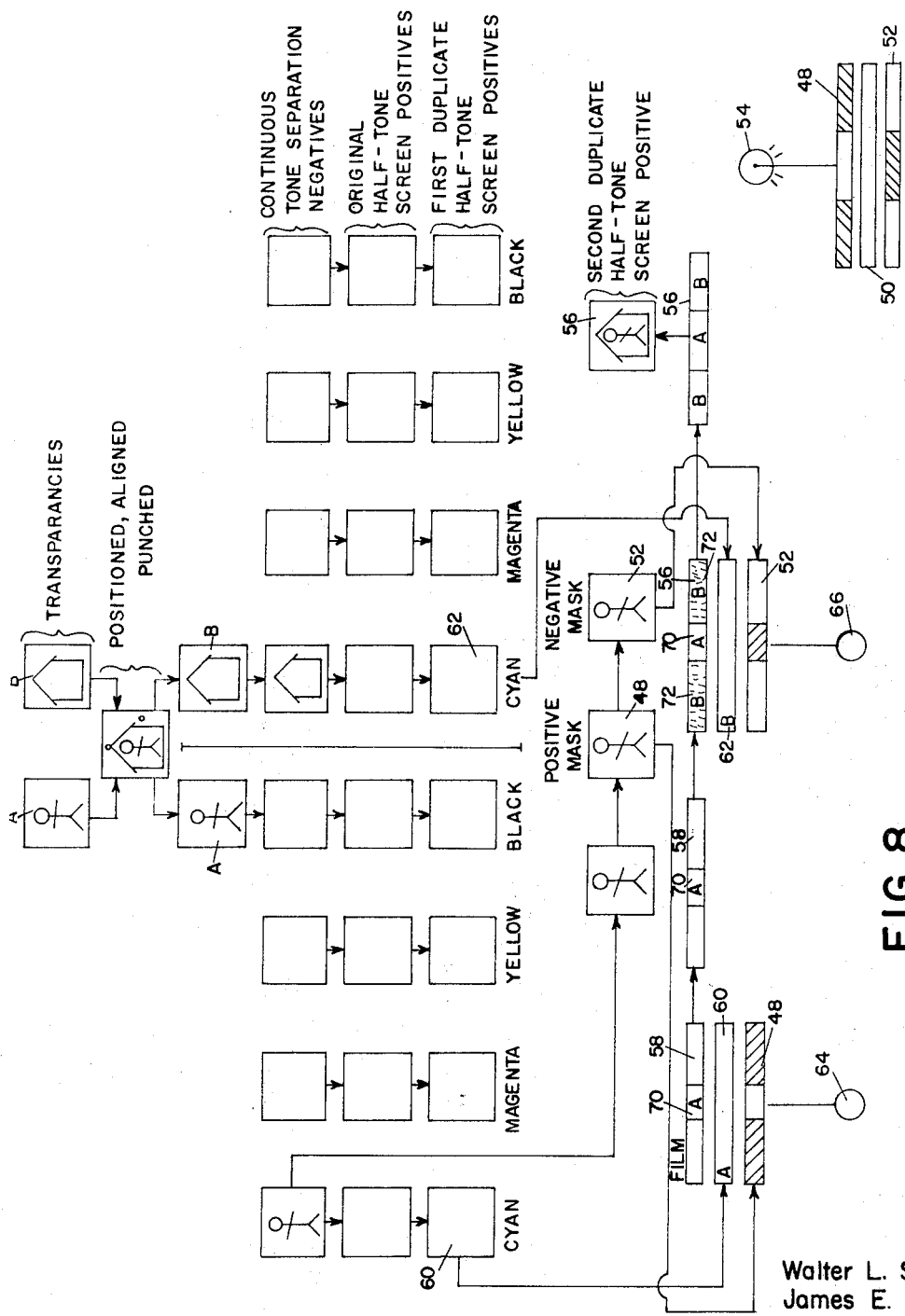

United States Patent Office 3,520,588
Patented July 14, 1970

3,520,588
AUTOSTEREO PICTURE
Walter L. Salyer and James E. Huffaker, Kingsport,
Tenn., assignors to Eastman Kodak Company,
Rochester, N.Y., a corporation of New Jersey
Filed May 26, 1967, Ser. No. 641,554
Int. Cl. G02b 27/22
U.S. Cl. 350—132                                 8 Claims

ABSTRACT OF THE DISCLOSURE

An autostereo picture composed of a plurality of separate picture images some of which contain parallax, thus giving a stereo illusion to the combined composite picture. Combinations may include images appearing at the point of convergence (in the plane of the picture, support, or frame), in addition to others at various positions either behind or in front of the point of convergence. The final picture form may also include various special relationships between two and three-dimensional images, for example: (1) a two-dimensional in the plane of the point of convergence and a three-dimensional appearing behind that plane, and (2) a three-dimensional in front of the plane of the point of convergence, a three-dimensional behind that plane and a two-dimensional in that plane.

The method for the production of such autostereograms may include the conversion of at least one two-dimensional picture image into a lineiform record containing parallax. This can be accomplished by correctly focusing such a subject or object image upon the photosensitive layer or film of an autostereographic device and thereafter providing the relative motions within that device and with respect to the object image. Pictures thus formed are then combined with others or combinations of others, either similar in construction or of the two-dimensional type, to form a finished autostereographic picture.

---

This invention primarily relates to the production of autostereographic pictures, including the reproduction and combination of several two-dimensional and/or three-dimensional prints or transparencies to form a single composite picture.

Autostereography has long been the subject of study, experimentation, and frustration. Since the early 1900's inventors have contributed ideas related to theories of the stereomechanism and to equipment, and methods for reproducing images in such a way as to culminate in a three-dimensional picture. Numerous problems have been attendant with these developments, and still today commercial fruition eludes producers because of those remaining.

As those who are knowledgeable in the art known, cameras suitable for use in the production of three-dimensional pictures are of considerable size and weight, and in order to produce the necessary lineiform image, require a combination of precise, accurate movements during the time exposure of the photosensitive layer or film. Thus, until now it has been necessary to limit autostereographic pictures to still life either posed in a studio or photographed, at considerable expense and inconvenience, on location.

It, therefore, is an objective of the invention to overcome these limitations so that it is now possible to reproduce still life subjects into autostereo pictures without the necessity of "on location" photography with an autostereographic camera.

Additionally, it is an objective of the invention to make possible the reproduction and use of action subjects in autostereographic pictures.

More particularly, the invention represents the discovery and development of a method of reproducing and converting two-dimensional pictures, transparencies, or the like, into autostereograms. In so doing it is necessary to rephotograph the existing two-dimensional picture using the three-dimensional technique of combined relative motions between the object image and the photographic film. Additionally, applicants have invented a method of combining two and three-dimensional pictures, or combinations thereof, in such a manner as to give improved clarity and illusion of depth.

Based upon these new techniques it is obvious that considerable advantages have been attained. It is now possible to photograph any object or scene with typical still or motion picture camera equipment and subsequently reproduce the resultant pictures in autostereo form, thus eliminating costly "on location" autostereographic camera use and vastly broadening the topical coverage possible for use in the final picture form.

These and additional objectives and advantages of the invention will become more apparent upon reference to the following discription, claims and appended drawings wherein:

FIG. 1 schematically illustrates an observer viewing a print incorporating the present invention;

FIG. 8 is a schematic flow diagram illustrating the procedures attendant to the combination photographs in the production of a composite autostereogram; and FIG. 9 depicts schematically the technique necessary in the production of a mask which is used in the FIG. 8 method.

Throughout the specification reference will be made to "planes." All are positioned relative to a horizontal plane passing through both eyes of an observer or the camera lens disregarding how the head or camera is tilted. A picture being viewed, when properly held, is in a vertical plane more or less orthogonal to the line of sight in the horizontal plane and the picture planes hereinafter referred to are parallel with the vertical plane so described unless otherwise designated.

Figure 1:
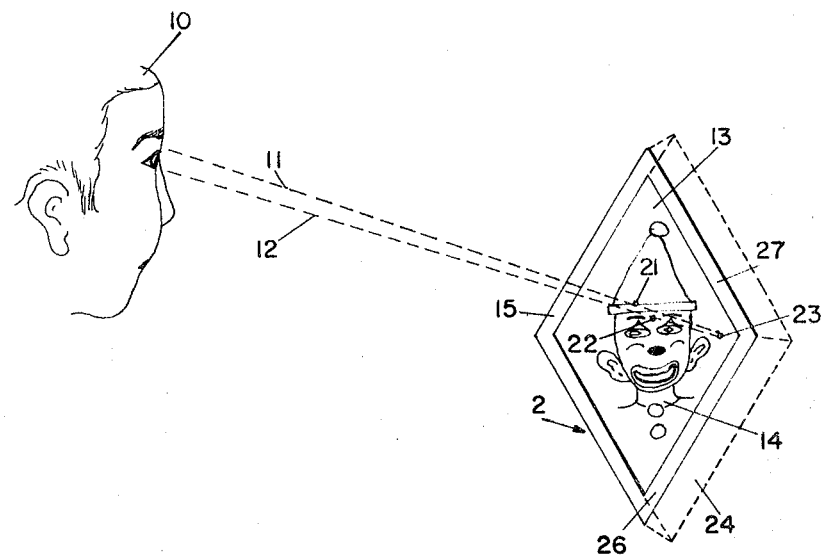

With continuing reference to the accompanying drawings wherein like reference numerals designate similar parts throughout the various views, and with initial attention directed to FIG. 1, reference numeral 2 is used to designate a picture of the invention. In FIG. 1, an observer 10 is viewing a picture made up of two complementary areas 13 and 14 which together make the full picture. The lines of sight to the left and right eyes are respectively indicated by broken lines 11 and 12. That is, the left eye is observing a point 21 of the image and the right eye is observing the point 22 of the image in the area 13. These points 21 and 22 may be images of the same part of an original two-dimensional picture and appear to merge at the point 23 in the plane 24 behind the plane of the point of convergence, that being support 15. The background and foreground image areas 13 and 14 may be of any scene desired and may be made from or composed of two-dimensional pictures in which the reproduced binocular differences include a small degree of parallax as will hereinafter be discussed. The picture 2 is not limited to only two complementary areas but may include more if desired.

Figure 2:
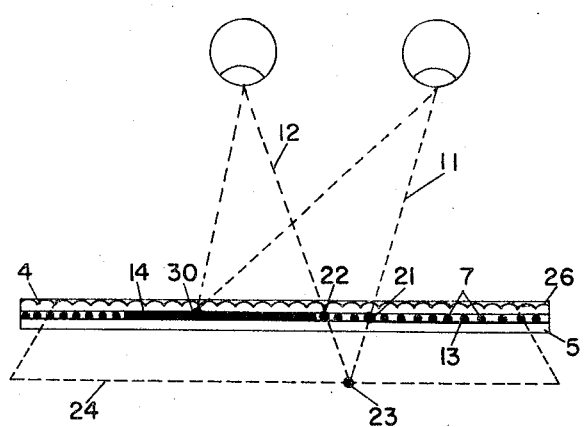
FIG. 2 is a schematic illustration of the principle of such viewing.

A further illustration of the principle is shown in FIG. 2. The point 30 of the picture contains both the right and left eye views of image area 14 which in this case is a two-dimensional undivided picture. The image area 13 appears to lie in plane 24 behind the plane of the point of convergence this being the plane of frame 5 in which area 14 lies.

A lenticulated viewing screen 4 covers both image areas 13 and 14, and is, of course aligned with the lineiform elements 7 of area 13. A picture according to the present invention has a number of interesting attributes. There is the depth effect in the picture area 13 because it appears to be floating at the plane 24 behind the plane of the point of convergence.

A two-dimensional picture may be made to appear "floating in space" away from, either in front of or behind the plane of the point of convergence, usually the plane of the support on which it is printed. This floating permits the monocular clues of depth to have a much greater effect. Monocular clues are evidenced by the fact that a near object hides a more distant one, that near objects appear larger, parallel lines appear to converge in the distance, and that distant objects appear more hazy and to have less contrast. Also the shape and placement of shadows enhance depth effects. The mechanism which gives the picture the "floating" appearance away from its actual surface, is further enhanced by deemphasizing the reference points which make a two-dimensional picture appear flat while emphasizing these monocular clues of depth.

The present invention further emphasizes this effect by the very fact that there is another picture, namely area 14, in a stereo relationship to the image area 13. This in turn greatly enhances the monocular clues to depth in the area 13. Most observers will not even notice that the whole picture 2 was not taken autostereographically. Instead either or both of the areas 13 and 14 may be composed of pictures made originally with an ordinary relatively inexpensive camera. A second, quite unexpected, effect is a reversal reaction from the background area 13 to the foreground area 14 tending to reduce the cardboard effect of that area. To most observers, even the two-dimensional picture area 14 in the plane of the support, appears to be rounded and to have depth. That is, the monocular clues such as the placement of shadows give a roundness to area 14 when it is associated with the floating background 13. The overall effect is quite astounding and attractive.

Autostereographic cameras of traditional design have fixed limits of lens traverse. As the lens to subject distance becomes great, the power of the camera to differentiate between distant points becomes less and finally approaches zero. This is particularly true for scenic exposures.

Figure 3:
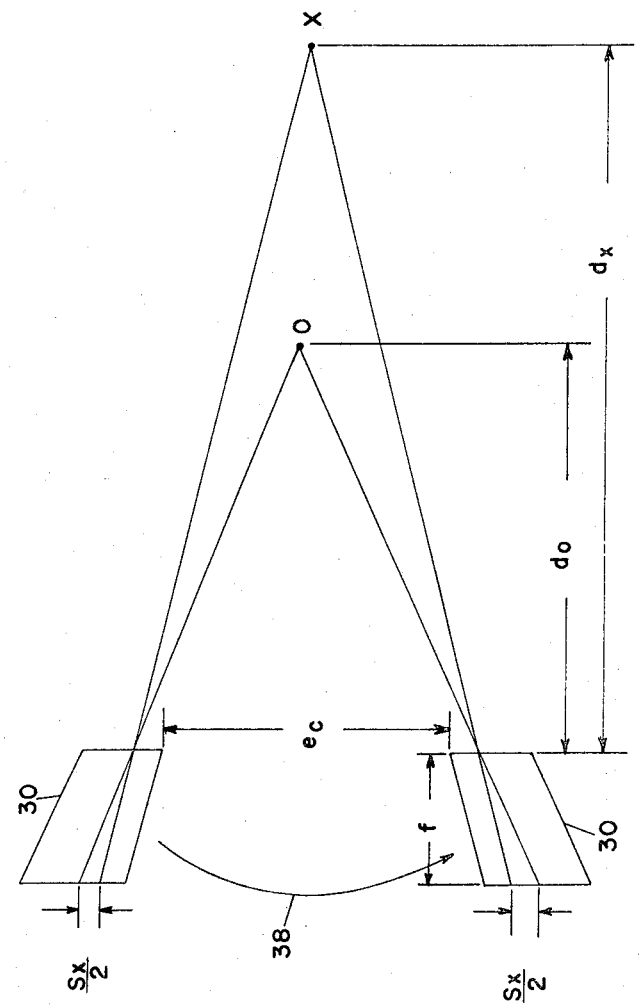
FIG. 3 is a schematic diagram illustrating parallax and showing the values determinative thereof.

This relationship is illustrated by FIG. 3 of the drawings and in Table I below. Table I values are predicated upon an autostereographic camera whose maximum lens traverse is 1½ feet using a 12 inch lens set at infinity.

The parallax created in a scenic picture taken under these conditions can be calculated using the formula:

$$S_x = e_c f (1/d_o - 1/d_x)$$

where:

$S_x$ = parallax difference of point $x$ with respect to point $o$.
$e_c$ = camera lens traverse (1½ feet).
$f$ = lense focal length (1 ft. at infinity).
$d_o$ = distance of the point of convergence (point $o$) from the camera lens.
$d_x$ = distance of the image object (point $x$) from the camera lens.

This formula and its derivation can be found discussed in an article "The Shape of Stereoscopic Images" by John T. Rule, appearing in The Journal of the Optical Society of America; vol. 31: pp. 124–129, 1941.

TABLE I

| Lens to point of camera convergence (feet) | Lens to subject point (feet) | Parallax on subject, when parallax on convergence point=0 (parallactic difference of the two points) (inches) |
|---|---|---|
| 3.0 | 3.33 | 0.6 |
| 30.0 | 33.30 | 0.06 |
| 300.0 | 333.30 | 0.006 |
| 3000.0 | 3333.30 | 0.0006 |

In each case point $o$ is about 10% closer to the lens than point $x$. Up to about 20 to 30 feet the camera, a typical autostereographic camera, creates enough parallax on point $x$ to distinguish its position from point $o$. Beyond 30 feet, however, the power to discriminate will diminish until, for all practical purposes, points $o$ and $x$ appear to be in the same plane.

Since the power to discriminate between distant points is essentially lost anyway, advantage of this fact can be taken to produce three-dimensional scenic pictures at a low cost with results practically equivalent to those obtained when "on location" autosterographic camera pictures are resolved.

Figure 4:
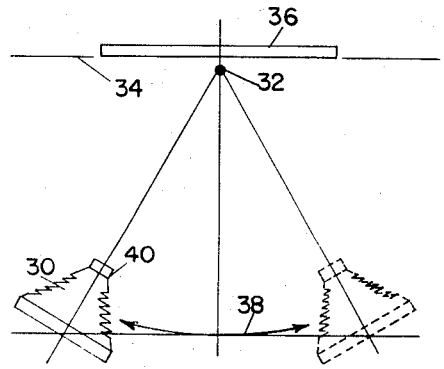
FIG. 4 is a schematic diagram indicating how a typical autostereographic camera is traversed around a two-dimensional picture forming the object image.
Figure 5:
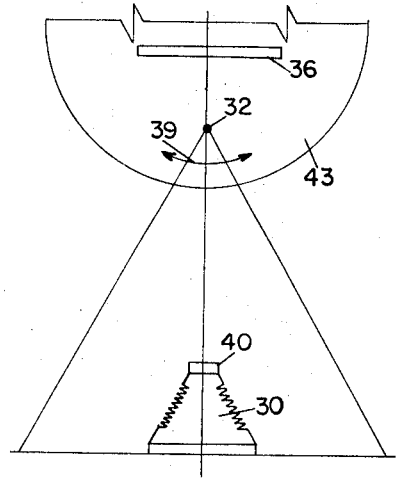
FIG. 5 is a schematic digaram illustrating another autostereographic picture taking technique in which the camera is fixed and the object image is traversed with respect thereto.

FIGS. 4–5 illustrate several of the techniques useful in the reproduction of two-dimensional pictures into extended stereo-base pictures. Using these techniques requires only that the scene, sought to be reproduced, be taken with an ordinary camera from which a transparency or print can be secured. With particular reference to FIG. 4 it can be seen that the print or transparency 36, so secured, is mounted and ready to be rephotographed with the autostereographic camera 30. The rephotography is accomplished in the conventional manner; the camera 30 is traversed, as is shown by arrow 38, with the point of convergence 32 being either in front of or behind the subject plane 34.

Figure 4A:
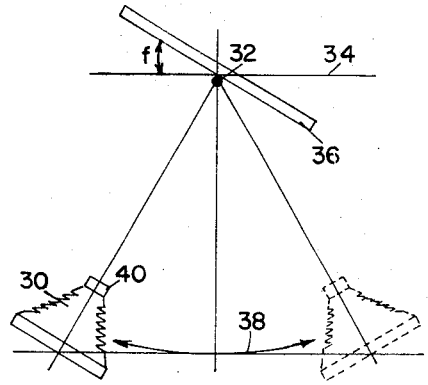
FIG. 4A is identical to FIG. 4 except that the object image has been skewed with respect to the plane of the point of convergence.

FIG. 4A is another embodiment of this same technique wherein the print 36 is mounted at an angle $f$ with respect to the subject plane 34. In this case the picture area behind the plane 34 will appear to recede while that area in front of plane 34 will appear to protrude from the plane of the point of convergence in the three-dimensional reproduction.

Figure 4B:
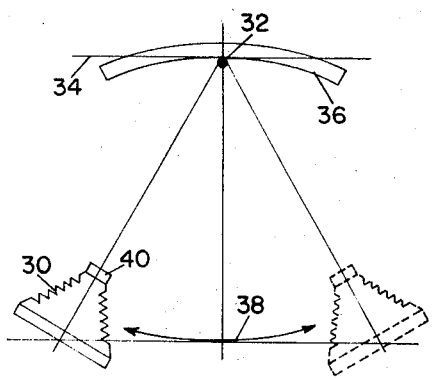
FIG. 4B shows an alternative arrangement for positioning the subject image or object.
Figure 4C:
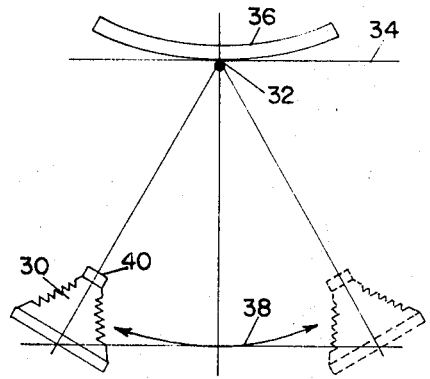
FIG. 4C is another position in which the subject or object image may be mounted.

The embodiments of FIGS. 4B and 4C simply show further modifications in which the two-dimensional subject is contorted to produce varied but similar effects. The technique is not intended to be limited to these embodiments alone since the subject picture could be bent and contorted into numerous such configurations to produce like effects in the final autostereo picture.

When using the above techniques in rephotographing two-dimensional subjects, the usual camera traverse will result in as much parallax on the autostereo print as is desired or as can be resolved. To achieve an equivalent amount with an autostereographic camera "on location" would require a stereo base of such magnitude that it is impractical to consider.

FIG. 5 schematically illustrates another variation of the technique discussed in connection with FIG. 4. In this illustration the subject print is mounted on a turntable 43 for rotation as indicated by arrow 39. The center of the camera 30 and its lens 40 remain fixed on a line through the axis of rotation of the turntable 38.

Figure 5A:
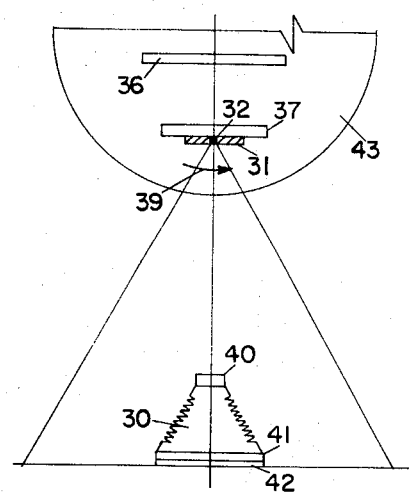
FIG. 5A is another schematic diagram showing two two-dimensional pictures being mounted for simultaneous reproduction with an arrangement similar to that shown in FIG. 5.
Figure 7:
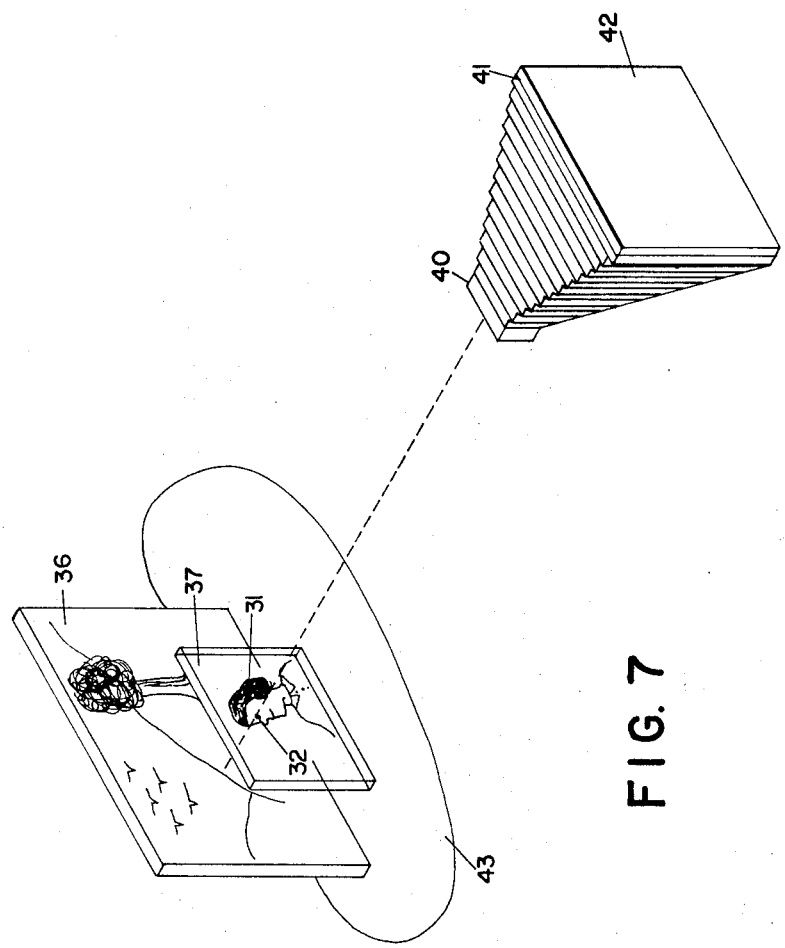
FIG. 7 is another view of the FIG. 5A arrangement for making pictures of the type described.

In accordance with the invention and as is shown in FIGS. 5A and 7, one simple method of preparing extended stereo base pictures involves mounting a cutout 31 of the picture which is to constitute the foreground area upon a sheet of glass 37. This picture is then physically mounted in front of a two-dimensional background picture 36. The latter picture 36 may show a person running, or present any other form of stopped motion as, for example, the birds therein depicted.

FIG. 7 schematically illustrates in combination a lens 40, taking screen 41, and sensitive film 42, of a standard autostereo camera 30 which takes the exposure series. The camera in FIG. 7 including the taking screen, is moved between exposures. The FIG. 5 illustration, as above discussed, shows the turntable 43 concept. In FIGS. 5A and 7, the turntable 43 is rotated about its vertical axis at lying in the plane of the point of convergence 32 in which the picture 31 is located. Thus, the ultimate lenticulated lineiform print made from these photographs has an image area of the picture 31 appearing in the plane of the point of convergence and an image area of the picture 36 appearing below or behind that of the picture support.

The foregoing represents only one method of producing combined autostereo pictures of the invention from a plurality of two-dimensional pictures.

Figure 6:
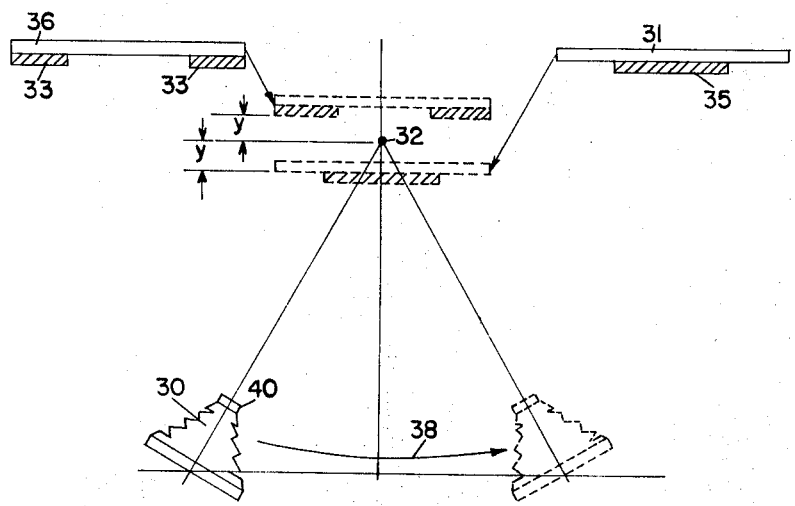
FIG. 6 is a schematic diagram showing a masking technique which may be used in the FIGS. 4 and 5 arrangements to produce a single autostereo negative.

Another similar method is depicted in FIG. 6. There the autostereographic camera 30 and lens 40, having a point of convergence at 32, is traversed around the two-dimensional picture subjects as is shown by arrow 38. Both pictures 36 and 31 are masked as at 33 and 35 respectively so that only the unmasked portion of each will be recorded on the image plane of the camera. Each of these masked pictures is, in turn, mounted in their dotted line position and the camera 30 is traversed to record the respective images. The camera traversal for each exposure is in the same direction, and as is observable from FIG. 6. The subject pictures, in order to completely fill their images areas are mounted equal distances Y in front of and behind the plane of the point of convergence. Such will also provide an equality of parallax on each picture with respect to the frame of the composite autostereo picture. If the camera traversal is reversed, a "psuedo-stereo" picture will result.

Another, and presently the preferred, method useful in the production of composite autostereo pictures is schematically shown in FIGS. 8 and 9. This technique combines two or more pictures into one by surprinting. The picture forms capable of being so combined, of course, may be either two or three-dimensional in nature. The following table, Table II, illustrates the possible combinations of three pictures.

TABLE II

| Picture number | Picture position | | | | | |
|---|---|---|---|---|---|---|
| 1 | 0 | 0 | 0 | 0 | 0 | 0 |
| 2 | + | + | + | ++ | ++ | − |
| 3 | ++ | −− | − | − | −− | −− |

0 point = the frame position (two-dimensional, point of convergence). (+) = in front of the frame (++) = in extreme front of the frame (−) = behind the frame (−−) = in extreme depth in the frame.

As those skilled in the art will appreciate, any and all of the autostereo pictures produced by this method will require a means of resolution, similar to the viewing screen 4 shown in FIG. 2. Resolution is most normally acquired through the use of lenticulated viewing screens which when properly aligned with the lineiform picture image production of the autostereo camera will, in combination with other stereomechanisms, produce the proper right and left eye images. These have a high optical efficiency and commonly have between 16 and 400 lenticules per horizontal inch, the number of which is equal to the number of lineiform images appearing on the picture.

The combined pictures, representing the picture of the invention, must register under each lenticule and have common centers at the lenticule.

Now, with particular reference to FIG. 8, the steps followed in the practice of the method of the invention are schematically outlined for the combination of two transparencies "A" and "B." If both are three-dimensional type transparencies, it is necessary that a grid be recorded along the edge of each during their production. Of course, any of the uniform and undivided two-dimensional transparencies (non-lineiform) need not be so treated. The introduction of this grid assures ease in the proper alignment of the transparencies, resulting in a constant relationship to the ultimate viewing axis.

Transparency A, which is to be surprinted, is placed over transparency B in the chosen position. Since the grid portions of each will overlap the two can be adjusted until exact parallelism and lineiform line overlapping is achieved. This insures that the viewing position of both match perfectly. After positioning, the transparencies are permanently punched for a pin register system. All continuous tone separations, masks, and screen positives are similarly key punched to assure proper registration throughout.

The transparencies A and B are again separated after punching and each is subjected to a typical and well known color separation process, where each is transformed into its component continuous tone separation negatives (cyan, magenta, yellow, and black). These are, in turn, reduced to original half-tone screen positives and then first duplicate half-tone screen positives.

From the continuous tone separation negatives of either transparency A or B (A being selected for purposes of illustration in this case), the best suitable for contact printing is selected. This separation, or the transparency itself, if none of the negatives are suitable, is then used to make a positive mask 48 (FIGS. 8 and 9) of the portion or area of picture A that is to be surprinted. The mask is made by contact printing either directly or indirectly on a high contrast film, depending upon whether a negative or transparency is used. If necessary, opaquing is added around the clear positive area of the mask to make certain that only the proper portion will ultimately be printed.

A negative mask 52 also is obviously required and may be conveniently made from the prepared positive mask 48 as is illustrated in FIG. 9. The positive mask 48 is laid over another piece of high contrast film 52 between which is located a clear spacer 50 of approximately 0.020 inch thickness. Thereafter film 52 is exposed by a light source 54. The spacer 50 causes the resulting negative mask 52 to be slightly larger than positive mask 48. This difference in mask size assures the proper filling of each area of the composite autostereo picture, those being a complete exposure without lapping at the area intersections.

As is well known in photographic color separation work, that preparatory to printing, screen positives are duplicated twice to ensure dot hardness. Preferably, but not necessarily, during this second duplication A and B pictures are surprinted. It is also possible to accomplish this during the first duplication. FIG. 8 follows the "cyan" separation of pictures A and B to a final surprinted second duplicate half-tone screen positive 56. However, in order to complete the process each of the other separations must also be similarly treated. These second duplicates 56 are ultimately used to produce the printing plates used in a typical four color printing process of the final autostereo pictures of this invention.

For surprinting, the first duplicate "cyan" half-tone screen positive 60 of A picture is placed in contact with duplicating film 58 and the positive mask 48 is placed over both. This combination is then exposed by a light source 64 resulting in the exposure of only area 70 upon film 58. The area 70, of course, represents the area of picture A which is to appear in the autostereo picture of the invention. After exposure the A screen positive and positive mask are removed and the first duplicate "cyan" half-tone screen positive of picture B is placed in contact with the same piece of film 58. Now the negative mask 52 of picture A is placed over both and light source 66 completes the exposure of film 58 in areas 72; this total exposure of film 58 results in a composite second duplicate half-tone screen positive 56.

The final autostereo pictures, subsequently printed by plates produced from these composite second duplicate half-tone screen positives 56, may result in any of the planar combinations aforementioned in Table II.

The techniques of this invention obviously represent advances over the prior art methods and pictures, and by their introduction expenses incurred in the production of autostereo pictures will be considerably reduced. In addition, it is now possible to have an almost unlimited topical coverage in autostereo pictures thus providing additional areas for marketability.

The invention may be embodied in other specific forms without departing from the spirit of the essential characteristics thereof. The present embodiments are therefore to be considered in all respects as illustrative and not restrictive, the scope of the invention being dictated by the appended claims rather than by the foregoing description, and all changes which come within the meaning and range of equivalency of the claims are therefore intended to be embraced therein.

We claim:

1. An article of manufacture comprising a support having a plurality of complementary image areas thereupon, said complementary image areas representing different depth planes with respect to each other, at least one of said image areas being a lineiform image, and at least one of said image areas being a two-dimensional image, a lenticular viewing screen attached to and covering said image areas of said support, said lenticular screen being positioned in predetermined alignment with said lineiform image, whereby said two-dimensional picture binocularly appears in a plane different from that of the complementary image areas.

2. An autostereo picture according to claim 1 in which the images in the said other areas are lineiform images in register with said viewing means.

3. A picture according to claim 1 wherein said two-dimensional image area binocularly appears in the plane of the point of convergence.

4. A stereo picture according to claim 3 in which the complementary area to said two-dimensional image area binocularly appears in a plane behind the plane of the point of convergence.

5. A stereo picture according to claim 3 in which a complementary area to said two-dimensional image area binocularly appears in a plane in front of the plane of the point of convergence.

6. A picture according to claim 1 wherein said image area of a two-dimensional picture is a lineiform image and binocularly appears in a plane other than the plane of the point of convergence.

7. An article of manufacture comprising a picture having at least two complementary image areas representing different depth planes with respect to each other, at least one of said areas containing a parallax panoramagram and at least one of said areas having a lineiform image of of a two-dimensional picture, and a lenticular viewing screen mounted on and in front of said picture in register with both of said lineiform images.

8. A picture according to claim 7 in which said two-dimensional picture image area binocularly appears in the plane of the point of convergence and the area of said parallax panoramagram binocularly appears in a plane other than that of said two-dimensional picture area.

References Cited

UNITED STATES PATENTS

| 1,993,448 | 3/1935 | Huber | 95—18 |
| 2,268,351 | 12/1941 | Tanaka | 350—144 |
| 2,318,983 | 5/1943 | Winnek | 352—810 X |
| 2,522,662 | 9/1950 | Brier et al. | 352—52 |
| 3,326,106 | 6/1967 | Ratliff | 95—18 |

FOREIGN PATENTS 410,515   5/1934   Great Britain.

JULIA E. COINER, Primary Examiner

U.S. Cl. X.R.

350—144; 352—81, 86